C. E. LAVERTY.
Drip Pan for Oil Barrel.
No. 234,411.                      Patented Nov. 16, 1880.
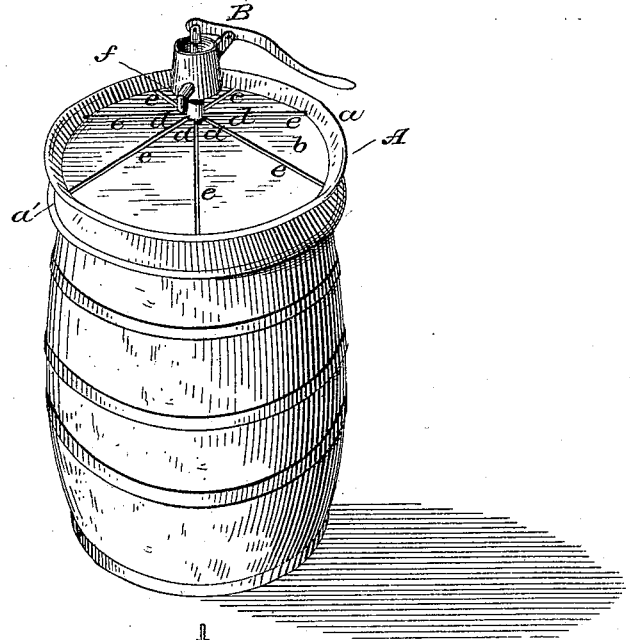
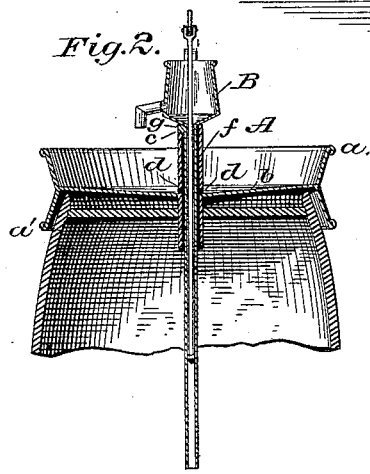
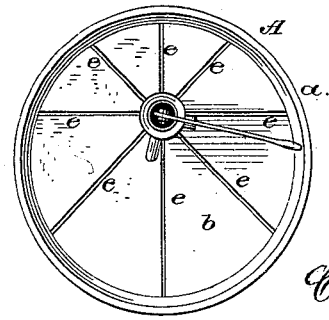
Witnesses:                        Inventor:
                                  Charles E. Laverty,
Frank Middleton                   by Ellis Spear
                                  Atty

UNITED STATES PATENT OFFICE.

CHARLES E. LAVERTY, OF GLADEVILLE, WEST VIRGINIA.

DRIP-PAN FOR OIL-BARRELS.

SPECIFICATION forming part of Letters Patent No. 234,411, dated November 16, 1880.

Application filed February 19, 1880.

*To all whom it may concern:*

Be it known that I, CHARLES E. LAVERTY, of Gladeville, in the county of Preston and State of West Virginia, have invented certain new and useful Improvements in Drip-Pans for Oil-Barrels; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to a removable device which, for convenience, I will call a "drip-pan," to be attached to fluid-holding vessels, to prevent the waste of the contents during the operation of removing the same from the barrel, and it is specially adapted to oil-barrels, where the contents are of a disagreeable nature and not pleasant to handle.

My invention consists, first, in adapting a drip-pan to fit various sizes of barrels by providing it with a flaring flange which fits over the head of the barrel; and, further, in the construction and arrangement of the parts, as fully hereinafter explained.

In the drawings, Figure 1 is a perspective view of my device attached to the end of a barrel; Fig. 2, a vertical central section. Fig. 3 is a top view of the pan.

Like letters of reference refer to like parts.

The letter A represents the drip-pan, constructed preferably of sheet metal, having an outwardly-flaring rim, $a$, on the upper side, and a corresponding outwardly-flaring flange, $a'$, on the under side, for the purpose of accommodating itself to the variation in the sizes of barrels.

$b$ is the bottom of the pan, which is dished downward toward the center, or, if desirable for room, to a point near the side of the barrel. In the surface of the bottom $b$ is formed a series of grooves, $e$, which lead to an upright tube, $f$, extending through the bottom, and provided with a series of perforations, $d$, through its shell at the end of the grooves for the passage of the fluid back into the barrel. This tube is made of sufficient length to steady the pump-stock, and extends above the barrel a suitable height to support the pump-head above any ordinary vessel that may be placed under it.

C is a slot in the end of the tube to receive a corresponding lug, $g$, on the side of the pump-stock, to keep the same from turning around during the operation of pumping.

B is a suction-pump, similar to those in common use, the stock of which extends downward through the tube $f$ into the barrel.

The drip-pan can be made of other forms than circular, to fit different-shaped vessels, and can be applied by simply making an aperture through the top of the vesssel the exact size of the drip-tube in the bottom of the pan, and placing the pan over it with the tube entering the hole, and pressing it down firmly until the pan fits tightly upon the exterior of the vessel.

I am, however, aware that drip-pans carrying pumps have been placed on the heads of barrels, but am not aware that they have been made adjustable to fit various sizes of barrels; therefore, Having described my invention, what I claim, and desire to secure by Letters Patent, is—

1. A drip-pan adapted to be applied to the top of oil-barrels, having a flaring flange, $a'$, to adapt it to different sizes of barrels, as described.

2. A drip-pan for oil-barrels, consisting of a dish-shaped pan adjustable to different sizes of barrels by a flange, $a'$, of the grooves $e$, and the tube provided with perforations, all constructed and arranged substantially as described and shown.

In testimony that I claim the foregoing as my own I hereunto affix my signature in presence of two witnesses.

CHARLES E. LAVERTY.

Witnesses:
  GEO. K. STORM,
  E. L. GOODRICH.